Nov. 9, 1954  A. S. BROWN  2,693,896
PRESSURE GAUGE CASE AND CLOSURE
Filed March 10, 1950
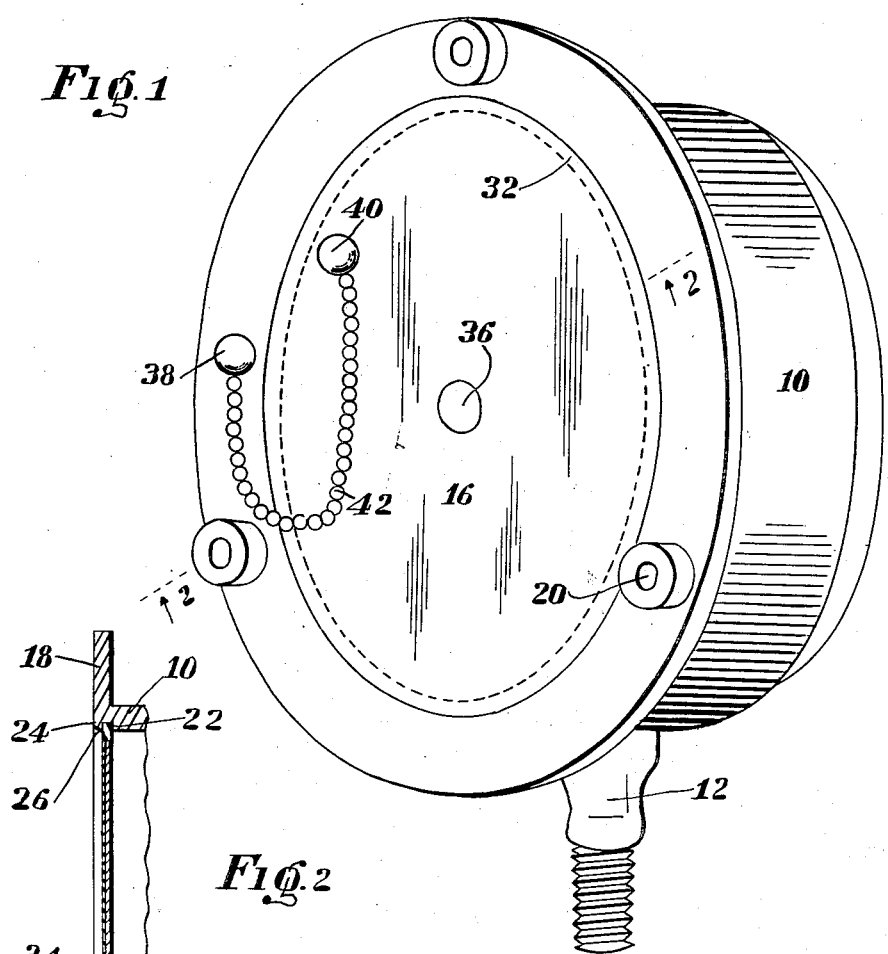
Fig.1
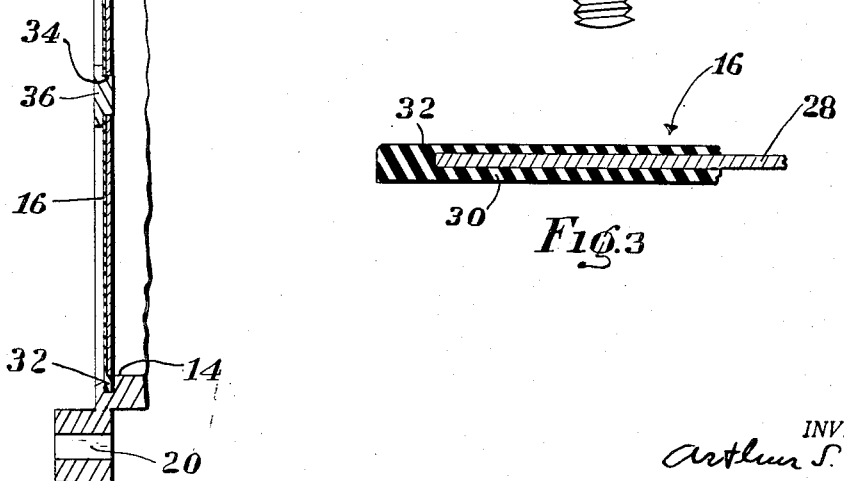
Fig.2
Fig.3
INVENTOR.
Arthur S. Brown
BY William R. Hulbert Jr.
ATTORNEY

2,693,896

PRESSURE GAUGE CASE AND CLOSURE

Arthur S. Brown, Webster, Mass., assignor to Acragage Corporation, Milford, Conn., a corporation of Massachusetts Application March 10, 1950, Serial No. 149,002

2 Claims. (Cl. 220—44)

This invention relates to pressure gauges and is more particularly concerned with a new and improved pressure gauge case having a blow-out closure for relieving sudden high internal pressures caused, for example, by rupture of the Bourdon tube.

Gauges for measuring pressure in systems and containers of liquids or gases as, for example, on tanks containing compressed oxygen or on steam boilers, etc., are susceptible to accidental rupture of the Bourdon tube or internal fluid conduits, resulting in an explosion in which portions of the gauge case may fly apart damaging nearby equipment and endangering the safety of personnel. In order to minimize this danger it has become good practice to provide a pressure gauge case having a relatively heavy shielding wall between the Bourdon tube and the indicating dial to prevent blowing out of the dial plate and glass cover, together with some type of releasable closure for the rear of the gauge which will immediately yield in case of sudden increased pressure within the gauge thus relieving the excess pressure and minimizing the danger of explosion. Such a gauge is described in U. S. Patent No. 1,488,034.

The principal object of the present invention is to provide a pressure gauge case having new and improved yielding closure means to relieve any excessive pressure released inside the case.

Another object of the invention is to provide an improved blow-out back for a pressure gauge which may be built, within limits, to give way with a high degree of predictability at any predetermined pressure.

Another object of the invention is to provide a blow-out back for a pressure gauge case which will provide a positive seal making the case water- and fume-proof when in place and which nevertheless will yield instantly and allow rapid dissipation of any suddenly released internal pressure.

A further object of the invention is to provide a blow-out back construction for a pressure gauge which is simple with no parts to get out of order or become loose or lost.

Still a further object of the invention is to provide a construction of the type described which will be relatively corrosion resistant.

With the foregoing and other objects in view, the invention is featured by the provision of a case for enclosing a pressure gauge mechanism, the case having a rear opening provided with an axially facing groove, and a blow-out closure, for said opening, the closure comprising a metal plate having a narrow peripheral strip of rubber bonded thereto, the strip providing a flexibile locking and sealing member adapted to be snapped into the groove and be releasably retained thereby and the rubber preferably coating the entire plate to prevent corrosion thereof.

Further objects, advantages and features of the invention will become apparent from the following detailed description of a preferred embodiment of the invention taken in connection with the accompanying drawings in which like numerals refer to like parts in the several views and in which:

Fig. 1 is a rear three-quarter elevation of a pressure gauge case incorporating the novel blow-out back of the invention;

Fig. 2 is a fragmentary section on line 2—2 of Fig. 1; and

Fig. 3 is an enlarged fragmentary cross section of a portion of the blow-out disc of the invention illustrating the manner in which the rubber is bonded to the metal plate.

The numeral 10 denotes a case for enclosing a pressure gauge mechanism. A nipple 12 permits connection of the gauge to a high pressure fluid system. The case 10 may be of any desired size and shape and contain any suitable pressure indicating means, for example, a Bourdon tube, a movement for translating the motion of the Bourdon tube into rotary movement of an indicator, a graduated dial beneath the indicator, and a transparent cover for the gauge face. In this type of gauge likewise it is usual to provide a relatively heavy partition separating the Bourdon tube from the face of the gauge, thus shielding the glass face from the effect of any rupture of the high pressure containing Bourdon tube. All of the foregoing elements contained within the case are common practice in the prior art and form no part of the present invention and consequently have not been illustrated in the drawings which reveal primarily the structure of the rear of the pressure gauge case and the novel yielding closure of the invention.

Referring now more particularly to Figs. 1 and 2, it will be observed that the case 10 has a circular rearwardly facing opening 14 adapted to receive and retain the blow-out back plate 16 of the invention. A flange 18 extends radially from the rear of the case and is provided optionally with three mounting openings 20. Formed along the interior of the case 10 and closely adjacent the rear surface thereof is an axially disposed groove 22 having an overhanging portion 24, the edge of the latter being bevelled as at 26 to facilitate insertion of the disc 16 and likewise to provide a relatively sharp retaining edge above the disc once it is in place.

As best seen in Fig. 3 the disc 16 comprises a circular metal plate 28 to which is bonded a Buna rubber coating 30 which extends radially from the outer edge of the plate 28 to provide a flexible peripheral locking strip 32 adapted to fit tightly within the groove 22 in the rear of the case 10.

I have found that Buna-N rubber is entirely suitable for use in the manufacture of my novel pressure gauge case closure since it is impervious to moisture and steam and is not adversely affected by oil and grease. It will be understood, however, that this type of rubber is only a presently preferred material and that other flexible resilient and relatively impermeable materials may be used so long as they may be suitably held to the metal disc 28.

Consequently the word "rubber" as used throughout this specification and the appended claims is not meant to be limited to Buna-N or natural rubber but will include any suitable material having the necessary characteristics.

A recommended procedure for manufacturing the blow-out disc is as follows:

First a steel disc of appropriate size and shape, for example 4⅜″ in diameter and ¹⁄₃₂″ thick is drilled to provide a central opening 34 which is used for locating in a rubber mold. The plate is then placed in a rubber mold and covered by rubber on both sides in a thin layer. One side may be ¹⁄₃₂″ and the other ¹⁄₆₄″ thick, the rubber extending beyond the edge of the plate approximately ⁷⁄₆₄″ as shown to provide resilient flexible means for snapping the disc into the groove 22 cut in the back of the case. When the rubber is applied to the steel disc, it fills the central hole in the disc completely. A hole is then punched in the rubber somewhat smaller than the shank of the rivet which will extend therethrough. The rivet 36 is then inserted, filling the hole 34, a tight fit being provided by the surrounding rubber, producing a fume-proof construction which will have the necessary strength should the disc be blown out from the casing.

As a matter of convenience I have also provided a socket 38 on the flange 18 and a similar socket 40 on the plate 16 connected together by a chain 42 which will hold the plate 16 when it is not in its inserted position or has been blown free. The mounting for the socket 40 may be produced in the same manner as that for the rivet 36 so that there will at all times be a good rubber seal making the case dust-proof and fume-proof.

The blow-out disc 16 may be readily snapped into position beneath the overhanging edge 26 of the groove 22 and by reason of its construction may be inserted and removed many times without injury to the rubber rim 32. I have found by actual tests that by varying the width and thickness of the rim 32, I can adjust the assembly to yield at any preselected internal pressure to a remarkable degree of accuracy. The construction is simple, fool proof and positive in operation. Because the entire back closure of the gauge is blown free a sizable opening is instantly made for dissipating the accumulated pressure caused by the bursting of the Bourdon tube. The pressure relief will be so nearly instantaneous as to prevent bursting of the front or other portions of the case. In addition to performing its blow-out function in an extremely efficient manner, the structure, according to the invention, also provides a positive and perfect seal against the entry of foreign materials such as dust and fumes. Likewise, the plate is readily removed and replaced to give access to the gauge interior and will give long and dependable service.

It will be understood that I have described and illustrated a preferred embodiment of the invention but that the same is susceptible to modifications and changes by those skilled in the art within the spirit and scope of the appended claims.

I claim:

1. In a pressure gauge, a cylindrical case which may be subjected to sudden great internal pressures, said case having a circumferential opening at one end and an internal continuous U-shaped groove surrounding said opening, and a blow-out closure disc adapted to fit said opening, said disc comprising a plate having a narrow peripheral radially outwardly extending annular strip of flexible sealing material bonded thereto, said strip fitting tightly in said groove to seal said opening and adapted to be snapped into said groove, portions of the outer wall of said groove and the adjacent portion of said strip coacting to furnish the sole mounting support for said disc when in place, said strip being adapted to flex to release from said groove upon abnormal increase of pressure within said case to permit said disc to be bodily blown out of said case by said pressure.

2. A structure in accordance with claim 1 in which said strip is composed of rubber and said plate is provided with a protective rubber coating bonded to its surface and integral with said strip.

References Cited in the file of this patent

UNITED STATES PATENTS

| Number | Name | Date |
| --- | --- | --- |
| 1,265,934 | Mapel | May 14, 1918 |
| 2,061,145 | Duffy | Nov. 17, 1936 |
| 2,429,149 | Wittenberg | Oct. 14, 1947 |
| 2,447,493 | Daniel | Aug. 24, 1948 |

FOREIGN PATENTS

| Number | Country | Date |
| --- | --- | --- |
| 449,827 | Great Britain | July 6, 1936 |
| 629,369 | Great Britain | Sept. 19, 1949 |

OTHER REFERENCES

"The Helicoid Gauge," p. 11 D. H. 818, U. S. A. September 1948. (Copy in Div. 36.)